(12) United States Patent
Fliszar et al.

(10) Patent No.: US 12,503,239 B2
(45) Date of Patent: Dec. 23, 2025

(54) UAV HAVING SHROUD COOLING OPENINGS

(71) Applicants: David G. Fliszar, Manhattan Beach, CA (US); Mathias Hintermann, Culver City, CA (US); Russell Douglas Patton, Playa Vista, CA (US)

(72) Inventors: David G. Fliszar, Manhattan Beach, CA (US); Mathias Hintermann, Culver City, CA (US); Russell Douglas Patton, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 468 days.

(21) Appl. No.: 17/730,257

(22) Filed: Apr. 27, 2022

(65) Prior Publication Data

US 2023/0348067 A1  Nov. 2, 2023

(51) Int. Cl.
| | |
|---|---|
| *B64D 13/00* | (2006.01) |
| *B64D 13/02* | (2006.01) |
| *B64D 41/00* | (2006.01) |
| *B64U 10/13* | (2023.01) |
| *B64U 30/20* | (2023.01) |
| *B64U 50/19* | (2023.01) |

(52) U.S. Cl.
CPC .......... *B64D 13/006* (2013.01); *B64D 13/02* (2013.01); *B64D 41/00* (2013.01); *B64U 50/19* (2023.01); *B64U 10/13* (2023.01); *B64U 30/20* (2023.01)

(58) Field of Classification Search
CPC ...... B64D 13/006; B64D 13/02; B64D 41/00; B64C 27/20; B64C 39/024; B64C 11/001; B64U 10/13; B64U 30/20
See application file for complete search history.

(56) References Cited

U.S. PATENT DOCUMENTS

| | | | |
|---|---|---|---|
| 6,575,402 B1 | 6/2003 | Scott | |
| 10,543,906 B1 * | 1/2020 | Graber | ............... H05K 7/20336 |
| 2015/0298799 A1 | 10/2015 | Bertrand et al. | |
| 2018/0155016 A1 * | 6/2018 | Tian | .................... B64C 29/0025 |
| 2020/0010200 A1 | 1/2020 | Chen et al. | |

(Continued)

FOREIGN PATENT DOCUMENTS

| | | |
|---|---|---|
| CN | 108513740 A | 9/2018 |
| CN | 109720558 A | 5/2019 |
| JP | 2020037347 A * | 3/2020 ............. B64U 50/19 |

OTHER PUBLICATIONS

English translation of JP-2020037347-A, dated Jul. 22, 2025 (Year: 2025).*

(Continued)

*Primary Examiner* — Edelmira Bosques
*Assistant Examiner* — Brett Peterson Mallon
(74) *Attorney, Agent, or Firm* — CM Law; Stephen J. Weed

(57) ABSTRACT

A UAV including a shroud with cooling openings to cool electronics in the UAV. The shroud includes propeller openings surrounding respective propellers. The propeller openings include intake openings that draw air from outside the shroud into the shroud to cool UAV components. The propeller openings are formed at an interface between an upper portion of the shroud and a lower portion of the shroud. The UAV includes a selector, such as a dial, including exit openings under the selector that provide air outflow from the shroud.

12 Claims, 6 Drawing Sheets

(56) References Cited

U.S. PATENT DOCUMENTS

2021/0323688 A1* 10/2021 Yajima .................. F04D 29/681
2022/0009647 A1*  1/2022 Johannesson .......... B64U 20/96

OTHER PUBLICATIONS

International Search Report and Written Opinion for International Application No. PCT/US2023/019897, dated Aug. 2, 2023 (Feb. 8, 2023)—11 pages.
Partial Supplementary European Search Report for EP 23797176.7 dated Oct. 13, 2025, 13 pages.

* cited by examiner

UAV HAVING SHROUD COOLING OPENINGS

TECHNICAL FIELD

The present disclosure generally relates to unmanned aerial vehicles (UAVs).

BACKGROUND

UAVs, including drones, are aircraft without a human pilot aboard. Conventional drones have various configurations (e.g., multiple rotors), a camera, and a global positioning system (GPS). Multirotor drones are able to capture images during flight using the camera. Components of a UAVs, such as processors and other electronics, develop heat during use.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
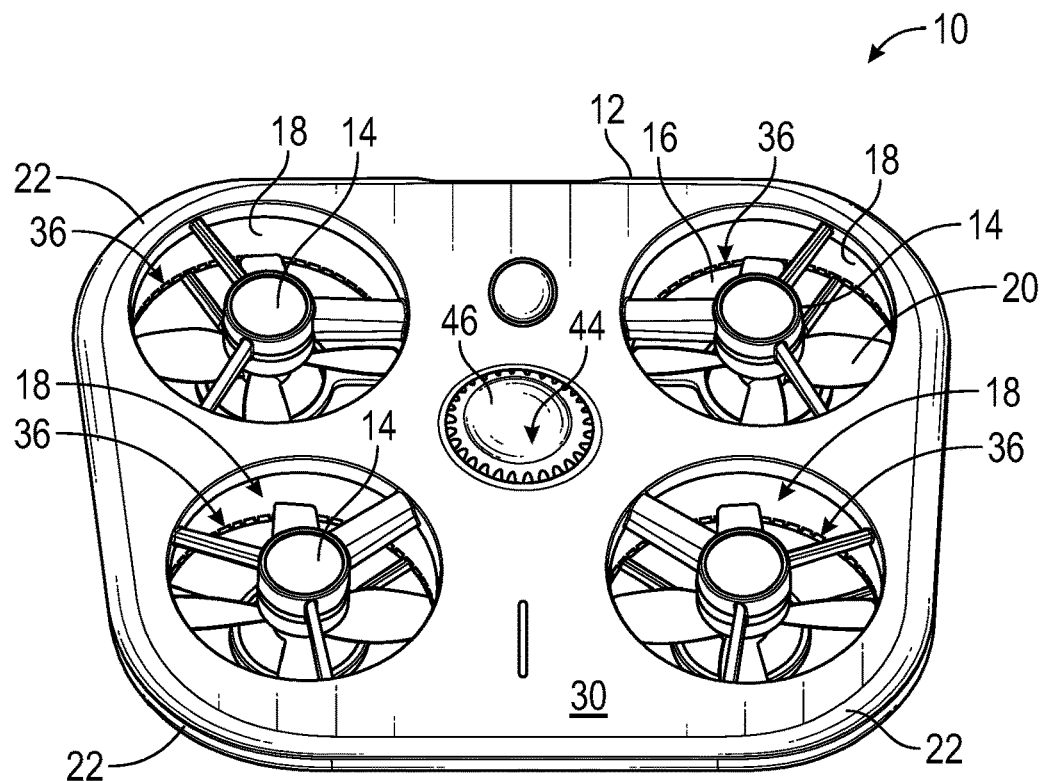
FIG. 1 is a top perspective view of a UAV having a shroud with cooling openings in the propeller openings.

A UAV including a shroud with cooling openings to cool electronics in the UAV. The shroud includes propeller openings for respective propellers. The propeller openings include intake openings that draw air from outside the shroud into the shroud to cool UAV components. The propeller openings are formed at an interface between an upper portion of the shroud and a lower portion of the shroud. The UAV includes a selector, such as a dial, including exit openings under the selector that provide air outflow from the shroud.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

The term "coupled" as used herein refers to any logical, optical, physical, or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

Reference now is made in detail to the examples illustrated in the accompanying drawings and discussed below.

Commercial UAVs typically include a camera for imaging the earth and other objects below, for instance, capturing still images and video. In some versions, the camera is fixed to the UAV, without the use of a gimbal for selectively positioning the camera. More complicated UAVs include an electronic receiver and an electronically configurable gimble and camera. A remotely located controller establishes a wireless link with the receiver of the UAV to control the UAV and the camera. The electronic receiver, electrically controllable gimbles, and cameras are expensive, fragile, and mechanically complex, and add to the weight and bulkiness of the UAV. Additionally, some of the components generate heat during use that can impact the performance of these components.

FIG. 1 is a top perspective view of a UAV 10 having a shroud 12 and a plurality of propellers 14 positioned in respective openings 16 extending through the shroud 12. Each of the openings 16 is formed by a cylindrical wall 18 annularly extending around a periphery of the opening 16.

Each of the propellers 14 include multiple blades 20. Each blade 20 may be metal or a non-conductive material. Typically, non-conductive materials, such as plastic, are used since they are lighter.

The shroud 12 has smooth surfaces and peripheral edges 22 and is sized such that it can fit in a garment (e.g., a pocket of pants or a jacket). The peripheral edges 22 are rounded such that there are no sharp edges, allowing the UAV 10 to be easily slipped into the pocket without damage to the UAV 10. The smooth surfaces and peripheral edges 22 also provide an elegant aesthetic design.

Figure 2:
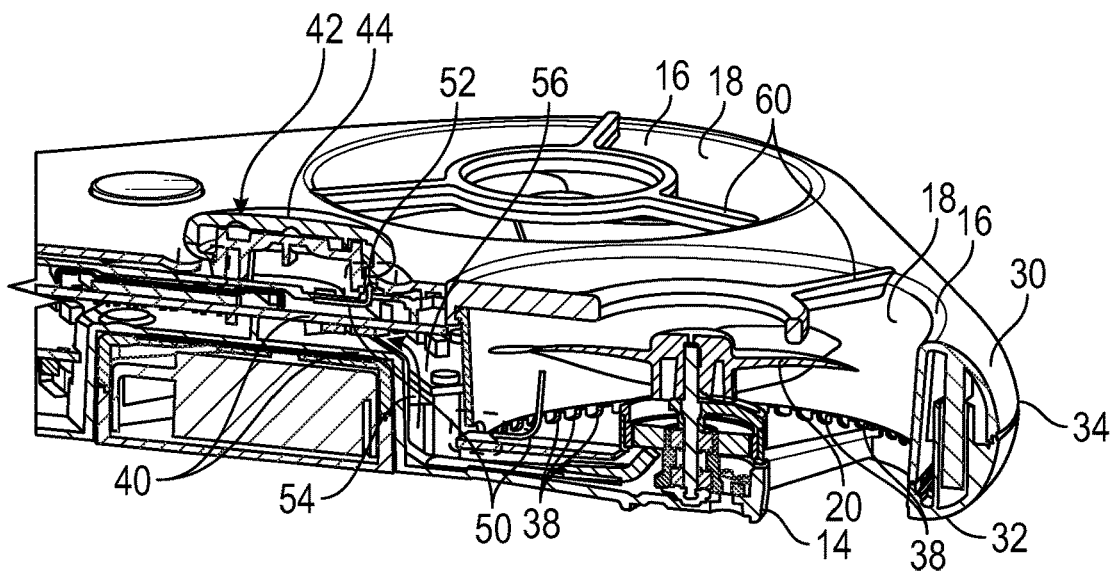
FIG. 2 is an enlarged sectional view of the UAV of FIG. 1.

The shroud 12 includes a rectangular upper portion 30 and a rectangular lower portion 32 (FIGS. 2 and 7) that are coupled to each other at an interface 34 (FIG. 2). In the illustrated example, the rectangular portions 30/32 completely encompass the propellor openings 16.

An annular air intake vent 36 is formed at the interface 34 in the cylindrical wall 18 between the upper portion 30 and the lower portion 32. A respective air intake vent 36 surrounds and is adjacent to each of the propellers 14. The air intake vent 36 includes a plurality of air intake openings 38 configured to draw air in from the respective openings 16 for delivery to electronics 40 disposed in the shroud 12.

Figure 4:
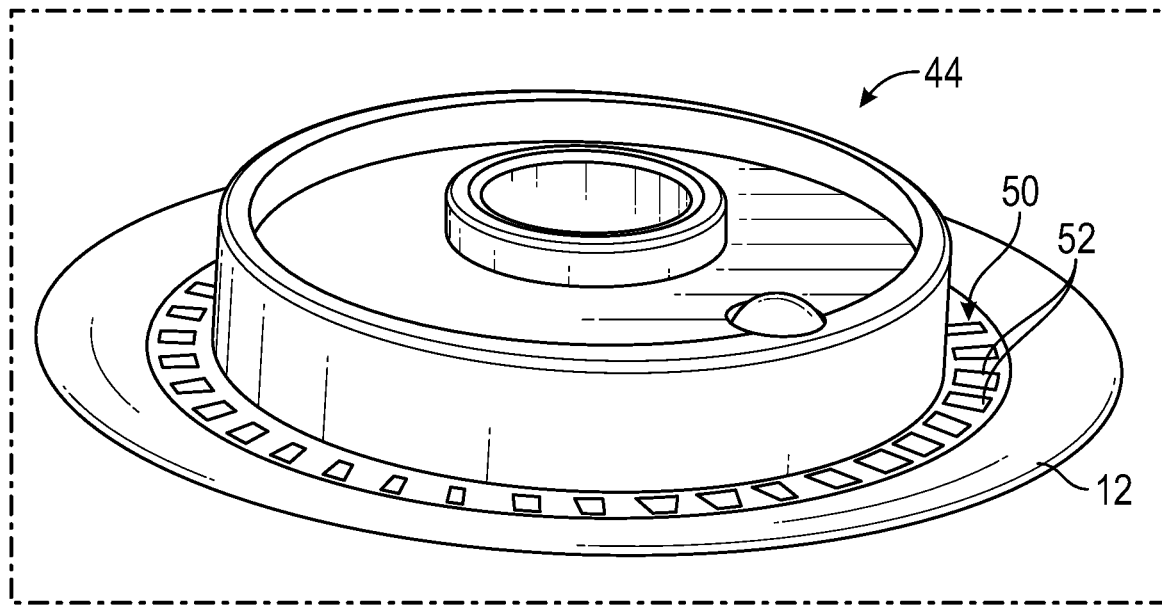
FIG. 4 is a perspective view of the UAV shroud with the dial removed.

Air pressure created by the rotating propeller 14 causes air to flow through the respective openings 38 of the intake vent 36 from an exterior of the shroud 12 into the shroud 12, to flow through the shroud 12 (e.g., along an air flow path 54 flowing adjacent components within the shroud 12; FIG. 2), and to exit the shroud 12 (e.g., through an air outflow vent 50; FIG. 4). The air entering the shroud 12 through the intake vent 36 is cooler than the components within the shroud 12 of the UAV 10, which produce heat during use. Heat from the components transfers to the air through thermal convention, thereby cooling the components and heating the air in the air flow as it passes the components. The heated air then exits the shroud to remove the heat from the interior of the shroud and make room for additional cool air to be drawn into the shroud 12.

FIG. 2 is a cross-sectional view of the UAV 10 illustrating an air flow path 54 that directs air though the shroud and adjacent the electronics 40. The air flow path 54 extends from the respective propeller opening 16, in through the air intake vent 36, through a shroud cavity 56 to cool the electronics 40, and out through the outflow vent 50. The electronics may include components of the UAV 10 such as, for example, a battery, a processor, and wireless transceiver. A propeller guard 60 is positioned over each of the propeller openings 16 to prevent unintentional access to a rotating propeller 14 for safety.

Figure 3:
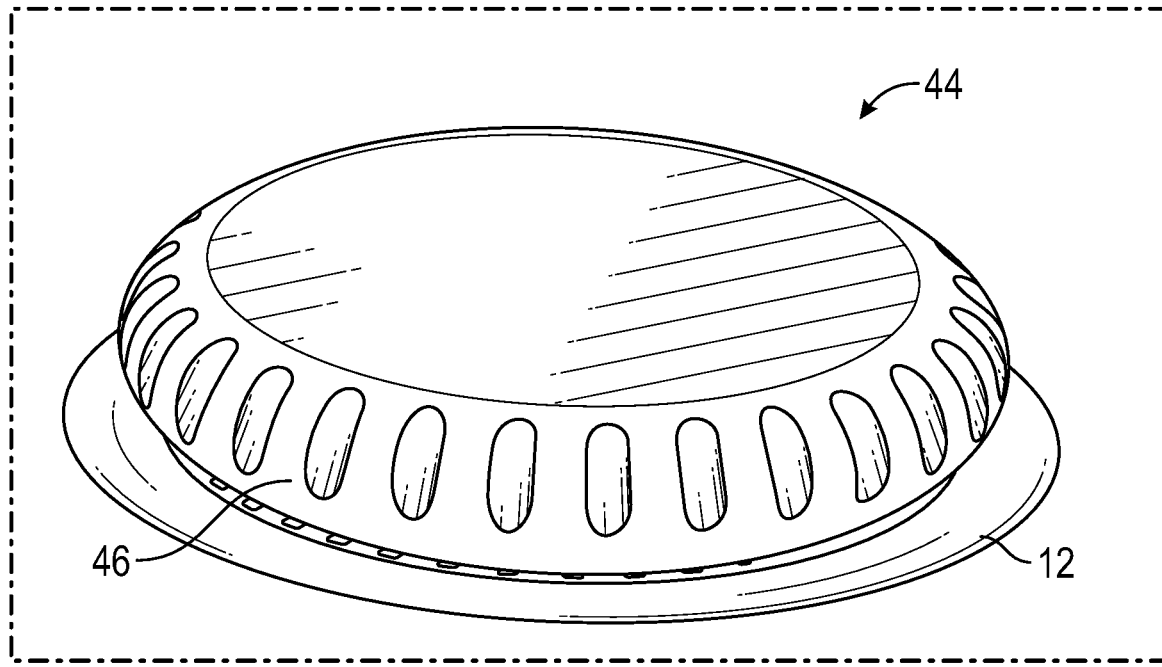
FIG. 3 is a perspective view of a selector configured to control a function of the UAV.

The UAV 10 also includes a selector 44, such as a dial, configured to be moved by a user to select functions of the electronics 40, such as a flight path stored in memory of the electronics 40. FIG. 3 depicts the selector 44 coupled to an exterior surface of the shroud 12. FIG. 4 depicts the selector 44 with the knob 46 removed to reveal an air outflow vent 50 under the knob 46 formed by a plurality of annularly positioned openings 52 adjacent the selector 44. The air outflow vent 50 is configured to allow the cooling air flowing past the electronics 40 in shroud cavity 56 along air flow path 54 to be expelled to the ambient environment. In another example, the vent 50 can be configured as an air inflow vent configured to draw ambient air into the shroud 12, and one or more of the vents 36 can also be configured to draw ambient air into the shroud 12 to cool the electronics 40 to customize the air flow path 54. In another example, air can be drawn into the shroud 12 through a first portion of the openings 38 of a vent 36 while air can be expelled from the shroud 12 through a second portion of the openings 38 of the same vent 36. Thus, the vents 36 and the vent 50 are each configured to draw air and expel air to customize the air flow path 54.

Figure 5:
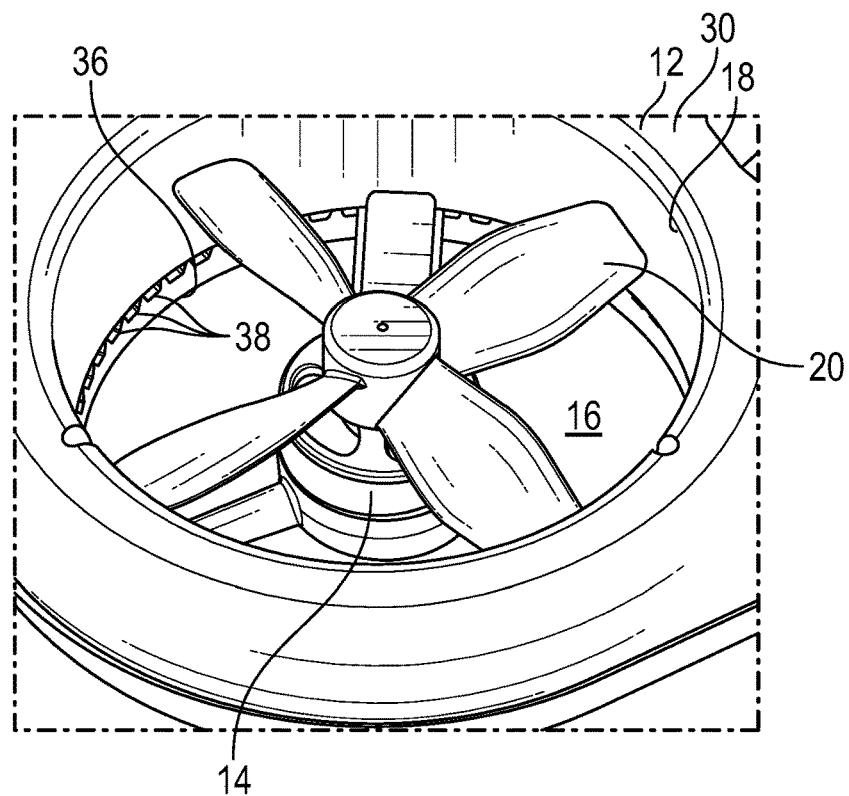
FIG. 5 is an enlarged perspective view of one propeller opening with the cooling openings providing air intake to cool internal electronics.
Figure 6:
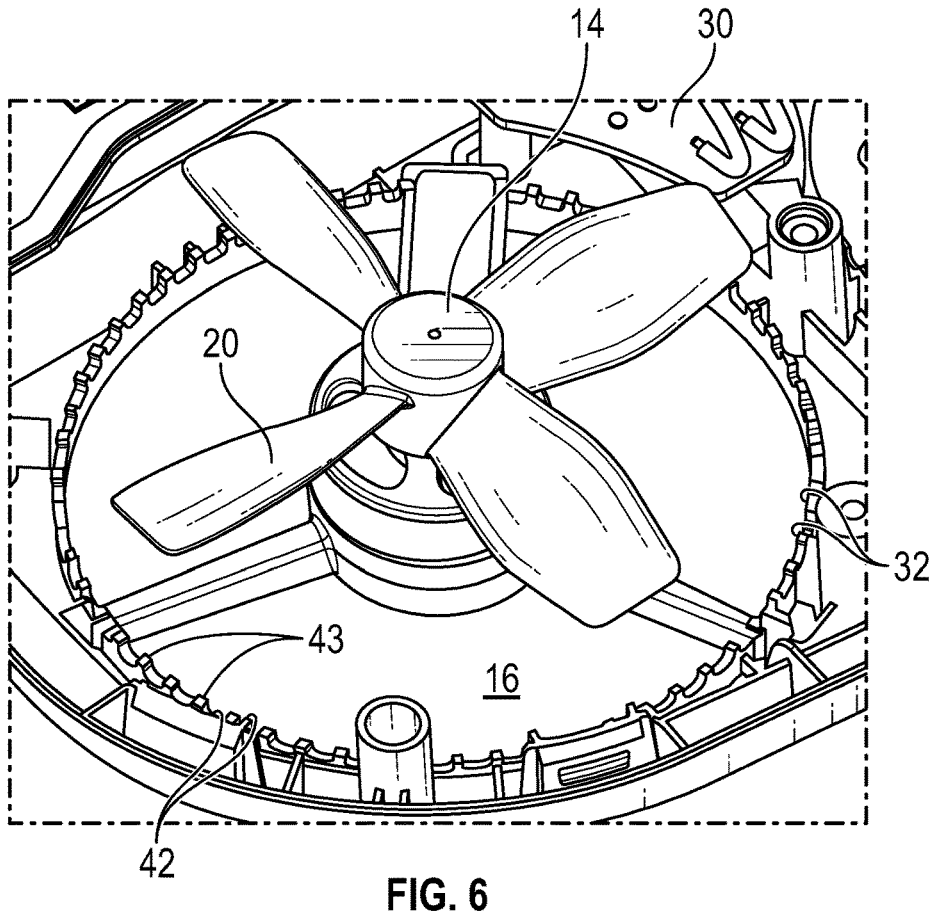
FIG. 6 is an enlarged sectional view of the propeller opening of FIG. 5 illustrating the propeller openings at an interface between an upper portion and a lower portion of the shroud.

FIG. 5 is an enlarged view of one propeller 14 within an opening 16 that shows the vent 36 including the annular openings 38. FIG. 6 is a sectional view of the opening illustrating an annular series of semicircles 42 separated by teeth 43 in a lower portion 32. The upper portion 30 includes a similar annular series of semicircles separated by teeth that mate with the semicircles/teeth of the lower portion 32. The semicircles/teeth of the respective portions form the air intake openings 38, when joined.

Figure 7:
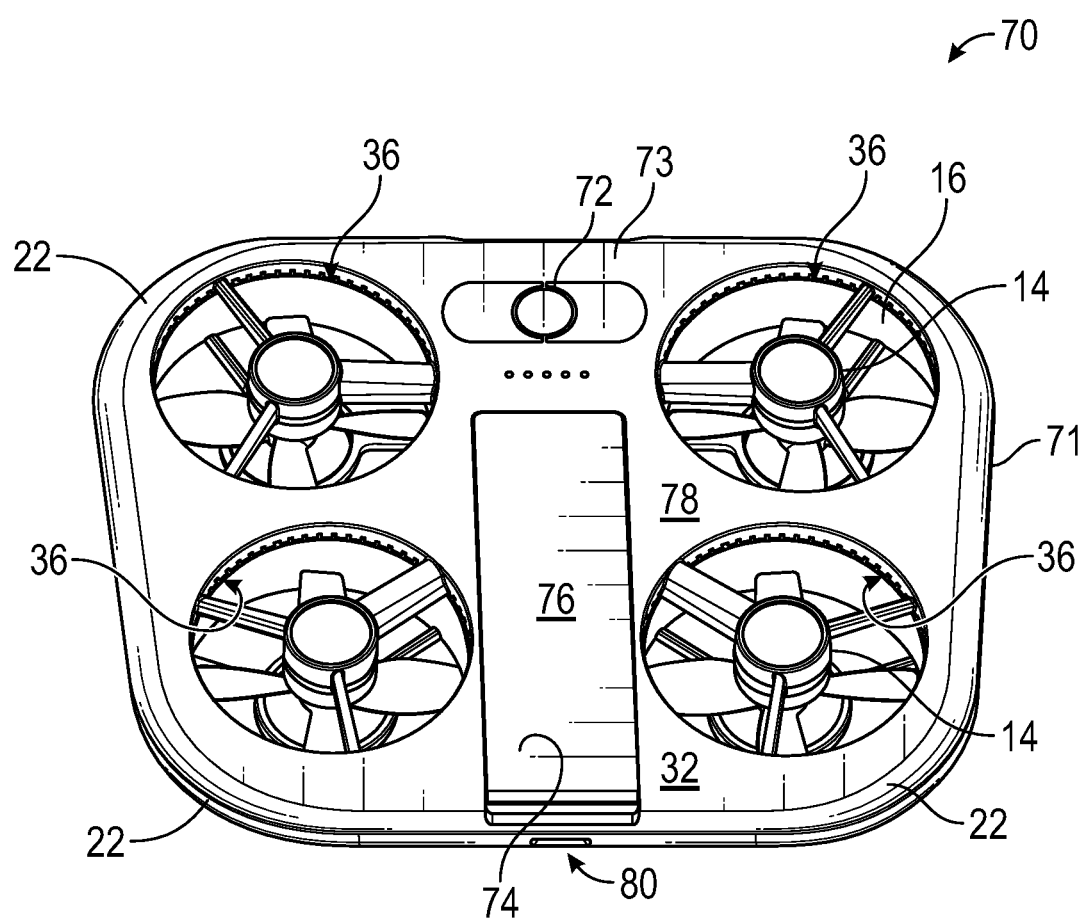
FIG. 7 is a perspective view of a UAV with a removable battery.

FIG. 7 depicts another example of a UAV 70 with a lower portion 73 of a shroud 71 including a camera 72 configured to capture images and a battery 74 configured to be selectively stored in a cavity within the lower portion 73 such that a bottom surface 76 of the battery 74 is flush with a bottom surface 78 of the lower portion 73. In another example, the camera 72 is a navigation camera used for navigation. The bottom facing camera 72 is used to identify visual features on the ground and help the UAV 10 navigate. The electronics 40 include memory containing a flight path configured to navigate the UAV 10. The camera 72 uses an approach of visual-inertial-odometry for position sensing, where the camera 72 uses "vision-based position sensing and navigation" rather than GPS. In another example, the camera 72 is used to for navigation and another separate camera is used for capturing images.

Figure 8:
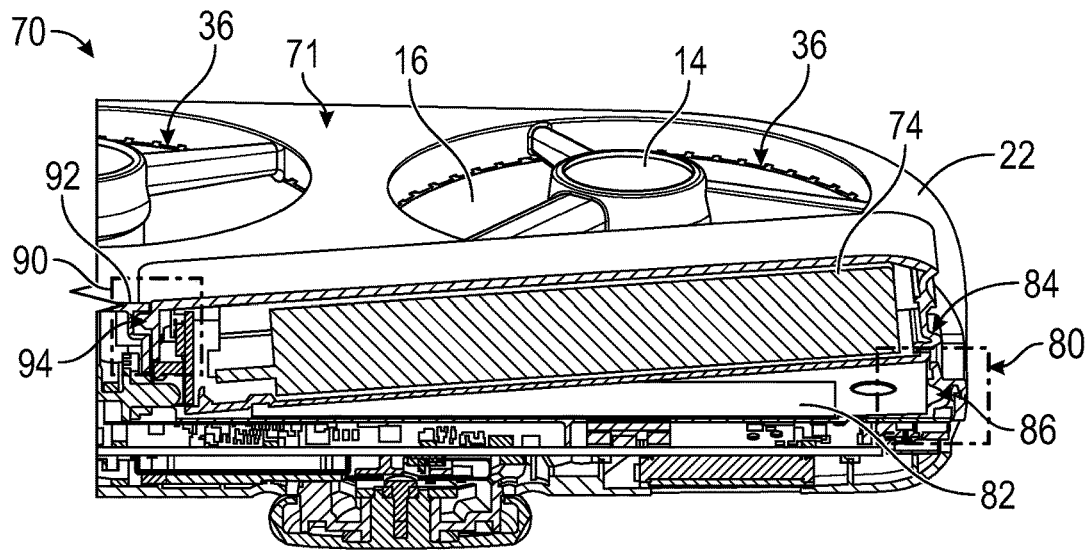
FIG. 8 is a cross-sectional view of the UAV of FIG. 7 with a battery being inserted into a housing cavity.
Figure 9:
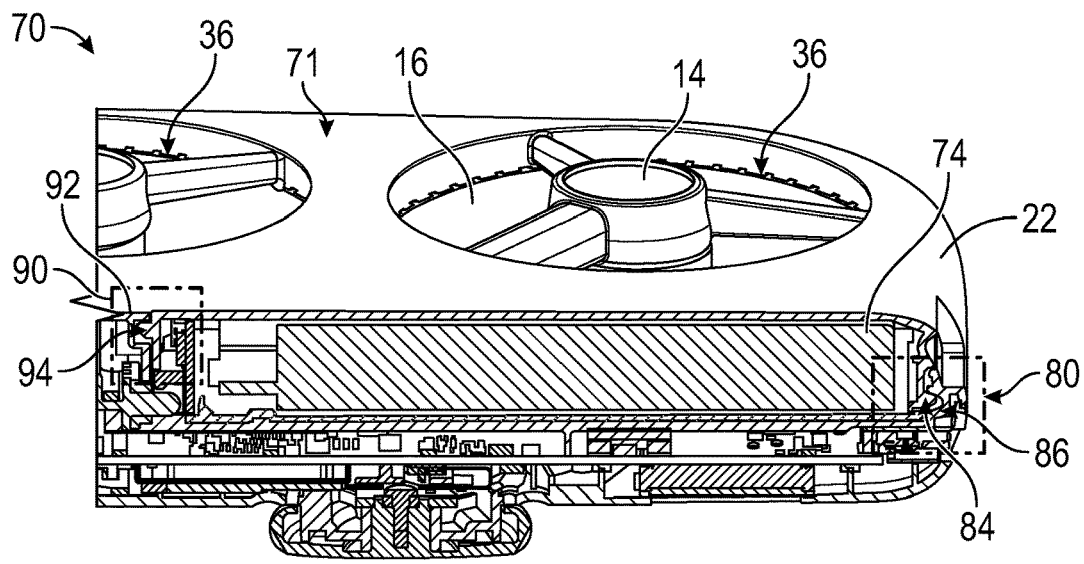
FIG. 9 is a cross-sectional view of the UAV of FIG. 7 with the battery inserted into a housing cavity.

FIGS. 8 and 9 are cross-sectional views of the UAV 70 with a front assembly 80 and a latch assembly 90 showing the battery 74 being inserted into a cavity 82 of the shroud 71 (FIG. 8) and the battery 74 secured in the UAV 70 by the front assembly 80 and the latch assembly 90 (FIG. 9). The front assembly 80 includes a flange 84 secured to a forward end of the battery 74 and a hook 86 located at a front portion of the shroud 71. The hook 86 is configured to secure the flange 84 in a stowed position as shown in FIG. 9. The latch assembly 90, at a rear portion of the cavity 82, includes a flange 92 and a protrusion 94 coupled to a rear portion of the battery 74 that is received by the flange 92 when the battery 74 is securely stowed in the cavity 82.

When the battery 74 is stowed, as shown in FIG. 9, the bottom surface 76 of the battery 74 is flush with the bottom surface 78 of the shroud 71. The bottom surface 76 and the bottom surface 78 together create an aerodynamic surface and allows the UAV 70 to be slid into a pocket of the user without damage.

Figure 10:
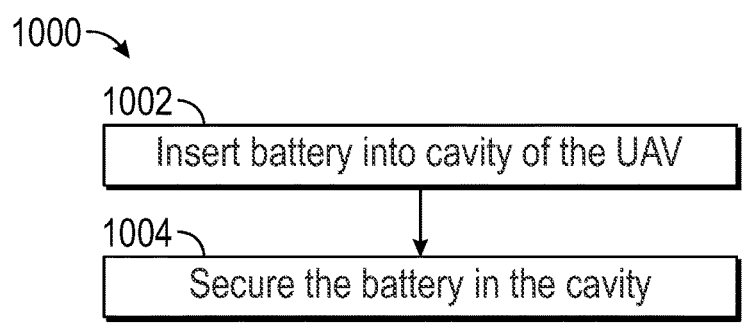
FIG. 10 is a flow chart illustrating a method of assembling the UAV.

FIG. 10 illustrates a method 1000 of securing the battery 74 in the cavity 82 of the shroud 71 of the UAV 70.

At block 1002, a user inserts the battery 74 into the cavity 82 such that the protrusion 94 of the battery 74 is inserted into the flange 92 at the rear portion of the cavity 82 as shown in FIG. 8. The protrusion 94 and the flange 92 form a hinge allowing the battery 74 to be hinged and secured in the cavity 82.

At block 1004, the user pushes the battery 74 completely into the cavity 82 such that the battery 74 lies flat in the shroud 71 and the outer surface 76 of the battery is flush with the bottom surface 78 of the housing 71 as shown in FIG. 9. The flange 84 bends slightly and captures the hook 86 to lock the battery 74 securely within the UAV 70 in a locked state. To remove the battery 74, such as for charging, the user releases the flange 84 and pulls the battery 74 from the cavity 82.

Figure 11:
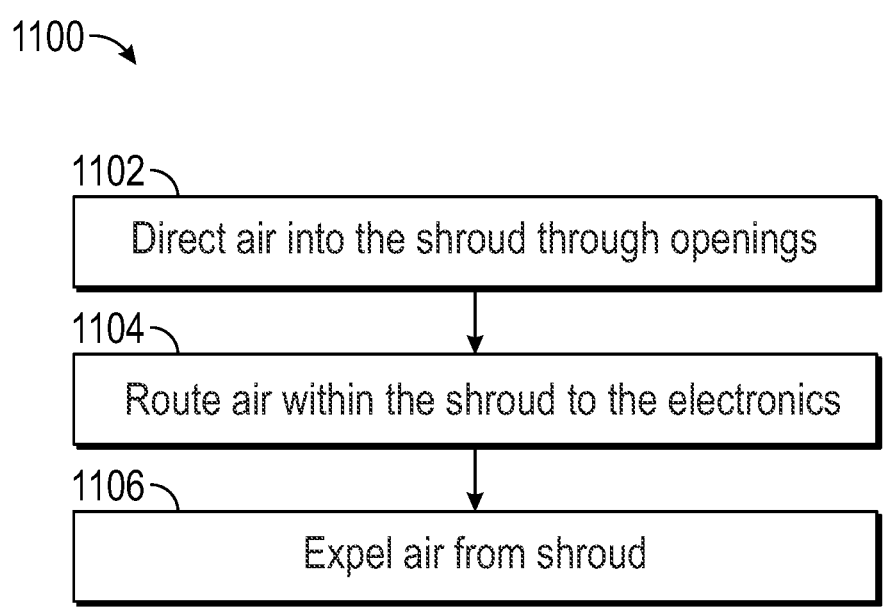
FIG. 11 is a flow chart illustrating a method of directing air through the shroud of the UAV to cool the electronics.

FIG. 11 illustrates a method 1100 for directing air through the shroud 12 of UAV 10 and toward the electronics 40.

At block 1102, air is drawn from outside the shroud 12 into the shroud 12 via the openings 38 of the air inflow vent 36. The rotating propellers 14 create pressurized air that directs an inflow of air from outside the shroud 12 into the shroud 12 through the openings 38 that encompass the respective opening 16.

At block 1104, the inflow of air is routed through the shroud 12 and toward the electronics 40. The airflow circulates within the shroud 12 and about the electronics 40 to cool the electronics 40. The airflow draws heat from the electronics as it passes adjacent the electronics.

At block 1106, the heated airflow is expelled from the shroud 12 via the openings 52 of the air outflow vent 50.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. An unmanned aerial vehicle (UAV), comprising:
a shroud having a shroud wall encompassing a cavity;
electronics including a processor configured to control the UAV disposed within the cavity and encompassed by the shroud wall;
a propeller opening formed by the shroud wall and extending through the shroud;
a propeller coupled to the shroud and positioned within the propeller opening;
an air intake vent disposed through the shroud wall in the propeller opening and communicating with the cavity, the propeller configured to force air through the air intake vent from the propeller opening into the shroud cavity and direct the forced air across the electronics;
a selector coupled to the processor, wherein the selector is coupled to an exterior surface of the shroud; and
an air outflow vent configured to direct air from within the shroud cavity out through the shroud wall, wherein the air outflow vent is disposed adjacent the selector.

2. The UAV as specified in claim 1, wherein the air outflow vent encompasses the selector.

3. The UAV as specified in claim 1, wherein rotation of the propeller is configured to generate pressurized air that flows from the propeller opening and through the shroud wall into the shroud cavity through the air intake vent, adjacent the electronics, and from the shroud cavity through the air outflow vent.

4. The UAV as specified in claim 1, wherein the UAV further comprises a battery having a battery surface, wherein the battery is configured to be inserted into the cavity such that the battery surface is flush with the shroud wall.

5. An unmanned aerial vehicle (UAV), comprising:
a shroud having a shroud wall encompassing a cavity;
electronics including a processor configured to control the UAV disposed within the cavity and encompassed by the shroud wall;
a propeller opening formed by the shroud wall and extending through the shroud;
a propeller coupled to the shroud and positioned within the propeller opening;
an air intake vent disposed through the shroud wall in the propeller opening and communicating with the cavity, the propeller configured to force air through the air intake vent from the propeller opening into the shroud cavity and direct the forced air across the electronics;
the shroud comprising an air outflow vent configured to direct air from within the shroud cavity out through the shroud wall, wherein the shroud wall has an upper portion and a lower portion coupled together at an interface, wherein the interface forms the air intake vent, wherein the air intake vent comprises a plurality of openings extending through the shroud wall, and wherein the upper portion and the lower portion each have recesses that together form the plurality of openings.

6. The UAV as specified in claim 5, further comprising a selector coupled to the shroud, and wherein the air outflow vent comprises the plurality of openings disposed about the selector.

7. A method of using an unmanned aerial vehicle (UAV), comprising a shroud having a shroud wall encompassing a cavity, electronics including a processor configured to control the UAV disposed within the cavity and encompassed by the shroud wall, a selector coupled to the processor, wherein the selector is coupled to an exterior surface of the shroud, a propeller opening formed by the shroud wall and extending through the shroud, a propeller coupled to the shroud and positioned within the propeller opening, and an air intake vent in the propeller opening and communicating with the cavity, the propeller configured to force air through the air intake vent from the propeller opening into the shroud cavity and direct the forced air across the electronics, the shroud comprising an air outflow vent configured to direct air from within the shroud cavity out through the shroud wall, wherein the air outflow vent is disposed adjacent the selector, comprising:
forcing air from outside the shroud into the shroud cavity via the air intake vent;
flowing the forced air about the electronics; and
directing air from within the shroud cavity out through the air outflow vent.

8. The method as specified in claim 7, wherein the air outflow vent encompasses the selector.

9. The method as specified in claim 7, wherein the UAV further comprises a battery having a battery surface, wherein the battery is configured to be inserted into the cavity such that the battery surface is flush with the shroud wall.

10. A method of using an unmanned aerial vehicle (UAV) comprising a shroud having a shroud wall encompassing a cavity, electronics including a processor configured to control the UAV disposed within the cavity and encompassed by the shroud wall, a propeller opening formed by the shroud wall and extending through the shroud, a propeller coupled to the shroud and positioned within the propeller opening, and an air intake vent in the propeller opening and communicating with the cavity, the propeller configured to force air through the air intake vent from the propeller opening into the shroud cavity and direct the forced air across the electronics, wherein the shroud wall has an upper portion and a lower portion coupled together at an interface, wherein the interface forms the air intake vent comprising a plurality of openings extending through the shroud wall, wherein the upper portion and the lower portion each have recesses that together form the plurality of openings, the method comprising:

forcing air from outside the shroud into the shroud cavity via the air intake vent; and flowing the forced air about the electronics.

11. The method as specified in claim 10, further comprising a selector coupled to the shroud, and an air outflow vent disposed about the selector.

12. The method as specified in claim 11, wherein rotation of the propeller generates pressurized air that flows from the propeller opening and through the shroud wall into the cavity through the air intake vent, adjacent the electronics, and from the shroud cavity through the air outflow vent.

\* \* \* \* \*